United States Patent [19]

Cleveland

[11] Patent Number: 4,941,243

[45] Date of Patent: Jul. 17, 1990

[54] METHOD FOR ASSEMBLING AN ANNULAR SHEAR ACCELEROMETER

[75] Inventor: Lester G. Cleveland, San Juan Capistrano, Calif.

[73] Assignee: Allied-Signal Inc., Morris Township, N.J.

[21] Appl. No.: 387,330

[22] Filed: Jul. 28, 1989

[51] Int. Cl.$^5$ ............................................. H01L 41/22
[52] U.S. Cl. .................................. 29/25.35; 310/329; 310/333; 310/367
[58] Field of Search ............... 29/25.35; 310/357, 369, 310/333, 329

[56] References Cited

U.S. PATENT DOCUMENTS 4,075,525  2/1978  Birchall .............................. 310/329

Primary Examiner—Carl E. Hall
Attorney, Agent, or Firm—Joseph R. Black; Robert C. Smith; James W. McFarland

[57] ABSTRACT

In a method for use in assembling an annular shear accelerometer (10), a nested combination of an expandable force ring (14), a crystal (16), and a mass element (18) is formed, and the force ring (14) is wedge to exert radially tensile force thereon. The force ring (14) and mass element (18) thereby cooperate to exert radially compressive force on the crystal (16), thus effecting friction locks between the radially adjacent pairs of elements which make up the nested combination (14, 16, 18).

5 Claims, 1 Drawing Sheet

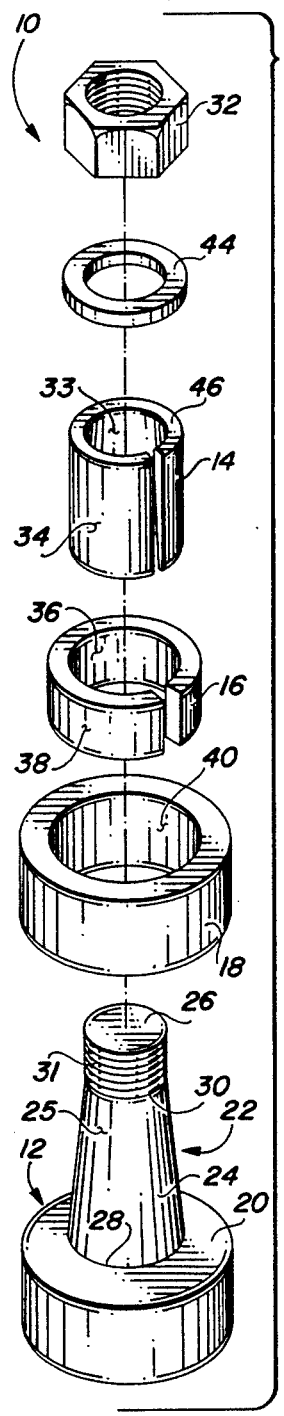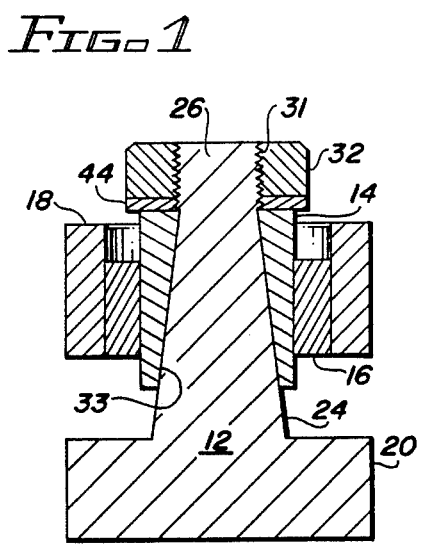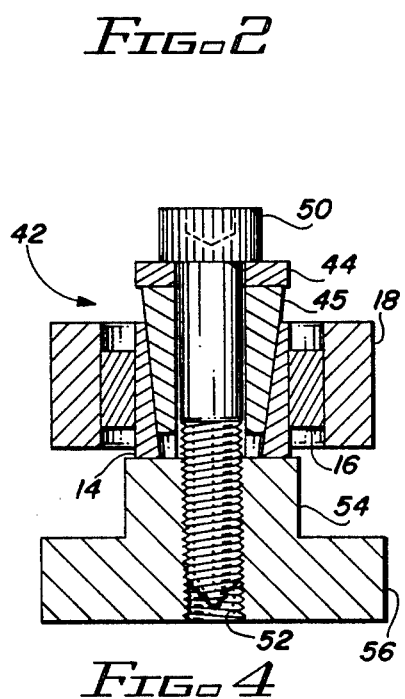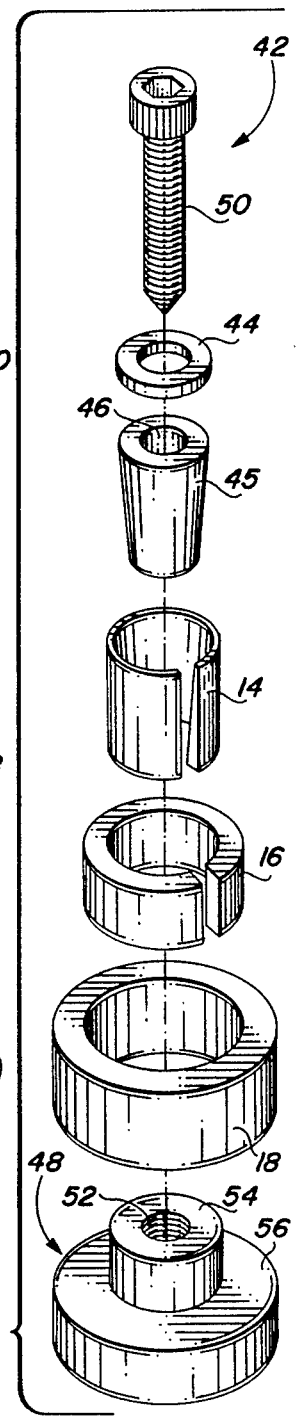
FIG. 1
FIG. 2
FIG. 3
FIG. 4

METHOD FOR ASSEMBLING AN ANNULAR SHEAR ACCELEROMETER

TECHNICAL FIELD

The present invention relates to accelerometers and, more particularly, to a method employed in assembling an annular shear accelerometer.

BACKGROUND OF THE INVENTION

The assembly of annular shear accelerometers entails the radial compression of an annular crystal element between a radially outer annular mass element and, typically, a radially inner annular force ring. The nested combination of the crystal element, the mass element, and the force ring is rigorously secured to a suitable mounting structure such as a cylindrical post, bolt, or functionally similar device that extends axially through the combination and abuts the radially inner surface of the force ring. Applicant is aware of two known methods for effecting this securement while providing the forementioned radial compression.

The first is to position around the mass element a radially outer ring having a tapered, convergent inner surface. The outer ring is then pressed in an axial direction so that its inner surface radially compresses the combination. In this method, the outer ring in effect becomes an extension of the mass element, and tolerancing is made more critical as a result of that effect.

The second method uses an outer ring or sleeve made of a shape-memory alloy such as that sold under the trademark TINEL. The ring is positioned around the mass element while still in its low-temperature phase, and shrinks in its high-temperature phase to radially compress the nested combination. The use of this method, in addition to requiring an expensive alloy, requires either cryogenic storage of the alloy or the additional operation of heating the ring after it is positioned around the mass element. In either case, disassembly of the accelerometer is either an impracticably expensive process, or is at least partially destructive.

SUMMARY OF THE INVENTION

The invention is a method for use in assembling annular shear accelerometers.

The method comprises the steps of forming a nested combination of annular elements which comprise, in radially outward order, an expandable force ring, a crystal, and a mass element; and wedging the force ring to exert radially tensile force thereon so that the force ring and mass element cooperate to exert radially compressive force on the crystal. Typically, though not necessarily, the step of wedging the force ring is performed substantially contemporaneously with the additional assembly step of securing the nested combination to a suitable mounting post.

The invention is believed to provide the following advantages over existing methods for assembling annular shear accelerometers: lower assembly cost attributable to higher speed of assembly and/or use of simple materials; and greater capacity for nondestructive disassembly.

DESCRIPTION OF THE DRAWINGS

FIGS. 1 and 3 are exploded perspective views of annular shear accelerometers, the assembly of which incorporates the method of the present invention.

FIGS. 2 and 4 are cross-sectional views taken in a plane coincident with the common axis of the accelerometer components illustrated in FIGS. 1 and 3 respectively, and show the accelerometers assembled.

DESCRIPTION OF THE PREFERRED EMBODIMENT

FIGS. 1 and 2 illustrate a first annular shear accelerometer 10 that is assembled in accordance with the invention. The accelerometer 10 comprises a mounting structure 12, an expandable force ring 14, an annular crystal element 16 (typically, a piezoelectric ceramic with electrode films applied to its radially inner and outer surfaces), and an annular mass element 18, all of which are mutually coaxial.

The mounting structure 12 is integrally formed and comprises a cylindrical base 20 from which a mounting post 22 extends. The mounting post 22 comprises a wedge portion 24 having a conical outer surface 25, and a distal cylindrical portion 26. The wedge portion 24 extends from its lower base 28, where it meets the cylindrical base 20, to its upper base 30, where it meets the cylindrical portion 26. The outer surface 31 of the cylindrical portion 26 is threaded for engagement with a nut 32.

The wedge portion 24 is dimensioned in relation to the force ring 14 such that its outer surface 25 diverges from a diameter which is less than the inside diameter of the force ring 14 to a diameter which is greater than said inside diameter. The force ring 14 has a radially inner surface 33 that is tapered at an angle which substantially matches that of the outer surface 25 of the wedge portion 24, as is best seen in FIG. 2. The force ring 14 is dimensioned in relation to the crystal 16 such that when the former is nested in the latter, its radially outer surface 34 abuts the radially inner surface 36 of the crystal. Similarly, the mass element 18 is dimensioned in relation to the crystal 16 such that when the latter is nested in the former its radially outer surface 38 abuts the radially inner surface 40 of the mass element.

In assembling the accelerometer 10, the crystal 16 is inserted in the mass element 18, thereby nesting the former in the latter. The force ring 14 is inserted in the crystal 16 while holding the mass element 18 in place, thereby nesting at least an axially extending portion of the force ring in the crystal. The nested combination of the ring 14, crystal 16, and mass element 18 is placed on the wedge portion 24 so that the outer surface 25 of the latter abuts the radially inner surface 33 of the force ring, and the cylindrical portion 26 projects outwardly from the ring. A washer 44 is placed over the cylindrical portion 26 so that it abuts the top surface 46 of the force ring 14. The nut 32 is threadedly engaged with the threaded surface 31 and tightened to captively secure the nested combination to the mounting post 22. As the nut 32 is tightened, it exerts axially directed force on the force ring 14. Because the outer surface 25 of the wedge portion radially diverges toward its lower base 28, the mounting post 22 wedges the force ring 14 in response to the axially directed force associated with tightening, thus exerting radially tensile force on the ring. Consequently, the force ring 14, in cooperation with the mass element 18, exerts a radially compressive force on the crystal 16. Friction locks are thereby effected between the outer surface 25 and the radially inner surface 33, between the radially outer surface 34 and the radially inner surface 36' and between the radially outer surface 38 and the radially inner surface 40.

FIGS. 3 and 4 illustrate a second annular shear accelerometer 42 assembled in accordance with the invention. The force ring 14, crystal 16, and mass element 18 are conested as in the previously-described accelerometer 10. A generally conical wedge 45 having an axially extending bore 46 formed therethrough is nested in the force ring 14. A two-piece mounting structure is defined by a stepped cylindrical base member 48 and a bolt 50. The base member 48 has an axially extending tapped bore 52 formed through smaller and larger cylindrical portions 54, 56. The bolt 50 serves as a mounting post and is extended through the wedge 45 and the nested combination (i.e. elements 14, 16, and 18). The force ring 14 is wedged by driving the bolt 50 into the tapped bore 52 as indicated, while holding the nested combination flush with or generally above the smaller cylindrical portion 54. The wedge 45 is axially pressed by the bolt 50, and exerts radially tensile force on the force ring 14 as the bolt is tightened in the tapped bore 52.

The reader should understand the foregoing text and accompanying drawings are not intended to restrict the scope of the invention to specific details which are ancillary to the teaching contained herein. Accordingly, the scope of the invention should be construed as broadly as is consistent with the following claims.

What is claimed is:

1. In the assembly of an annular shear accelerometer, a method comprising the steps of:

nesting at least an axially extending portion of an annular crystal in an annular mass element so that a radially outer surface of the crystal abuts a radially inner surface of the mass element;

nesting at least an axially extending portion of a radially expandable force ring in the crystal so that a radially outer surface of the ring abuts a radially inner surface of the crystal;

nesting at least an axially extending portion of a generally conical mounting post in the force ring so that a radially outer, generally conical surface of the post abuts a radially inner surface of the force ring: and exerting force that tends to produce relative motion between the radially inner surface of the force ring and the radially outer surface of the post in a direction such that the ring is urged toward a lower base of the post, in response whereby the ring is urged to expand in radially outward directions, thereby radially compressing the crystal between the ring and the mass element.

2. A method as in claim 1 comprising the further step of captively securing the force ring, crystal and mass element to the post.

3. A method as in claim 2 wherein the exerting step is effected as a response to performance of the securing step.

4. A method as in claim 1 wherein the steps are performed in the order therein recited.

5. In the assembly of an annular shear accelerometer, a method comprising the steps of:

nesting at least an axially extending portion of an annular crystal in an annular mass element so that a radially outer surface of the crystal abuts a radially inner surface of the mass element:

nesting at least an axially extending portion of a radially expandable force ring in the crystal so that a radially outer surface of the ring abuts a radially inner surface of the crystal:

nesting at least an axially extending portion of a wedge member having a radially divergent outer surface in the force ring so that the divergent outer surface abuts a radially inner surface of the force ring: and exerting force that tends to produce relative motion between the radially inner surface of the force ring and the divergent surface such that the ring is urged along the divergent surface in a direction of divergence, in response whereby the ring is urged to expand in radially outward directions, thereby radially compressing the crystal between the force ring and the mass element.

* * * * *